United States Patent
Wang et al.

(10) Patent No.: US 10,875,179 B2
(45) Date of Patent: Dec. 29, 2020

(54) IMPEDANCE CONTROL METHOD FOR BIPED ROBOT AND APPARATUS AND BIPED ROBOT USING THE SAME

(71) Applicant: UBTECH ROBOTICS CORP LTD, Shenzhen (CN)

(72) Inventors: Yuesong Wang, Shenzhen (CN); Youjun Xiong, Shenzhen (CN); Mingguo Zhao, Shenzhen (CN)

(73) Assignee: UBTECH ROBOTICS CORP LTD, Shenzhen (CN)

(*) Notice: Subject to any disclaimer, the term of this patent is extended or adjusted under 35 U.S.C. 154(b) by 0 days.

(21) Appl. No.: 16/660,822

(22) Filed: Oct. 23, 2019

(65) Prior Publication Data

US 2020/0206925 A1 Jul. 2, 2020

(30) Foreign Application Priority Data

Dec. 29, 2018 (CN) .......................... 2018 1 1654870

(51) Int. Cl.
*G01F 23/26* (2006.01)
*B25J 9/16* (2006.01)
*G05B 19/19* (2006.01)

(52) U.S. Cl.
CPC ........... *B25J 9/1664* (2013.01); *B25J 9/1607* (2013.01); *B25J 9/1653* (2013.01); *G05B 19/19* (2013.01); *G05B 2219/36429* (2013.01)

(58) Field of Classification Search
CPC ...... B25J 9/1664; B25J 9/1607; B25J 9/1653; G05B 19/19; B62D 57/032
See application file for complete search history.

(56) References Cited

U.S. PATENT DOCUMENTS 5,129,044 A * 7/1992 Kashiwagi ............. B25J 9/1633
  700/251
2017/0128136 A1 * 5/2017 Post ....................... A61B 34/10

FOREIGN PATENT DOCUMENTS

CN 106483964 A 3/2017
CN 106965187 A 7/2017

* cited by examiner

*Primary Examiner* — Muhammad S Islam

(57) ABSTRACT

The present disclosure provides an impedance control method for a biped robot as well as an apparatus and a biped robot using the same. The method includes: correcting an impact force on a landing leg in the two legs of the biped robot using a natural attenuation function, and taking the corrected impact force as an input of an impedance control; obtaining an impedance model of the biped robot; determining a transfer function of the impedance control based on the impedance model; calculating an output of the impedance control based on the input of the impedance control and the transfer function of the impedance control; determining a joint angle of each joint based on the output of the impedance control and a planned pose of the biped robot; and transmitting joint angle information of each joint to motor(s) of the joint to perform the impedance control.

12 Claims, 5 Drawing Sheets

IMPEDANCE CONTROL METHOD FOR BIPED ROBOT AND APPARATUS AND BIPED ROBOT USING THE SAME

CROSS REFERENCE TO RELATED APPLICATIONS

This application claims priority to Chinese Patent Application No. 201811654870.5, filed Dec. 29, 2018, which is hereby incorporated by reference herein as if set forth in its entirety.

BACKGROUND

1. Technical Field

The present disclosure relates to impedance control technology, and particularly to an impedance control method for a biped robot as well as an apparatus and a biped robot using the same.

2. Description of Related Art

When a biped robot walks, an impedance control acts on the entire two legs supporting period from a suspending leg being landed on the ground to the other leg being off the ground. The impedance control is widely used in the walking of the biped robot because it can effectively reduce the impact of the external force when touching the ground, for example, when the leg of the robot steps on the ground, there will be a feedback force, and the impedance control needs to analyze the feedback force so as to realize the control of each movable joint on the two legs of the robot and reduce the impact of the external force on the robot. However, the impedance control will cause the deformation of the robot and affect the balance of the robot when walking.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments of the present disclosure. For those skilled in the art, other drawings can be obtained according to the drawings without creative efforts.

DETAILED DESCRIPTION

In order to make the objects, technical solutions and advantages of the embodiments of the present disclosure more clear, the technical solutions of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

Figure 1:
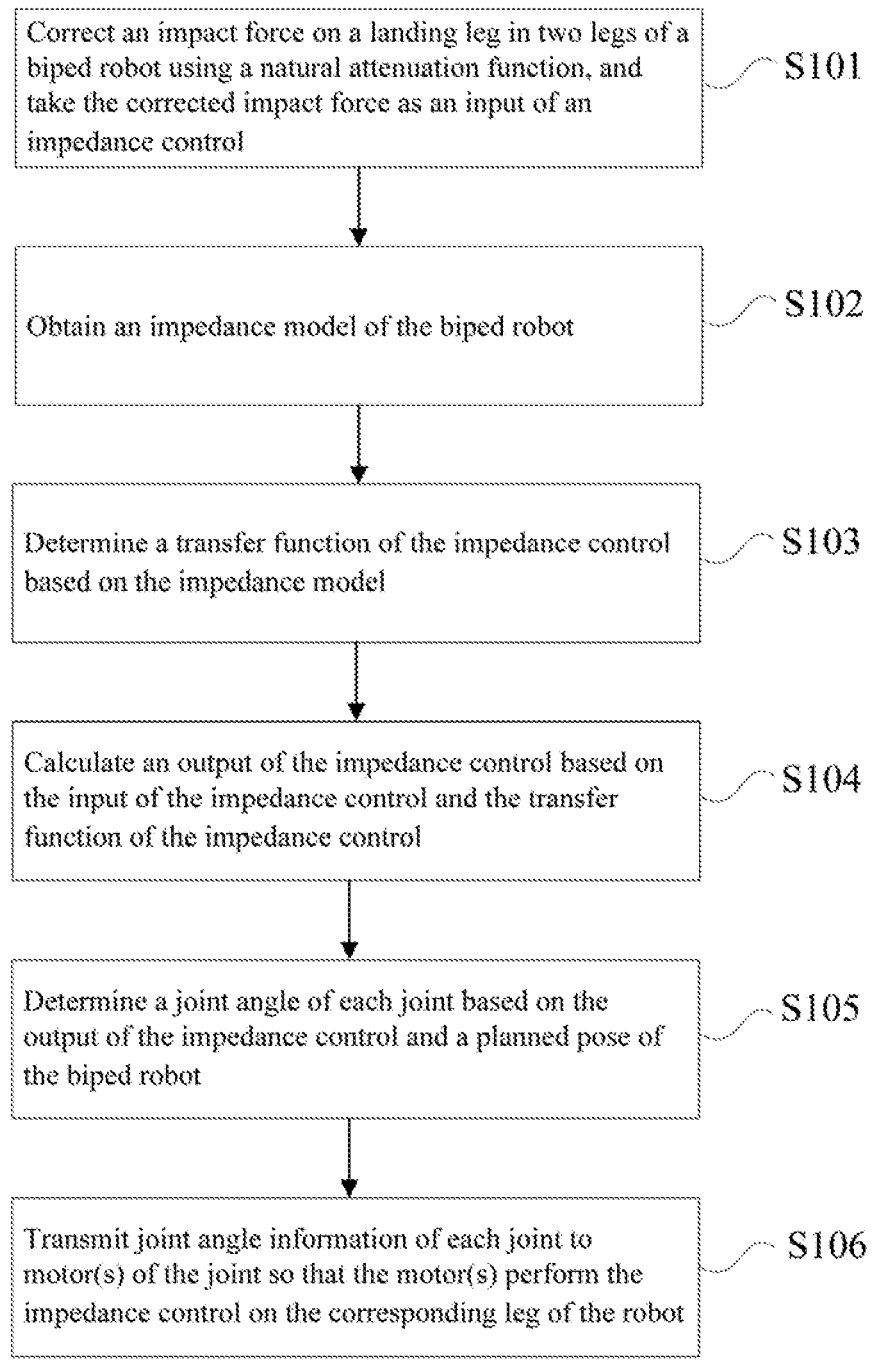
FIG. 1 is a flow chart of an embodiment of a biped robot impedance control method according to the present disclosure.

FIG. 1 is a flow chart of an embodiment of a biped robot impedance control method according to the present disclosure. In this embodiment, an impedance control method for a biped robot is provided. In which, the biped robot has two legs (e.g., a left leg and a right leg), and each of the legs includes one or more joints, where each joint includes a motor. The method is a computer-implemented method executable for a processor of the biped robot, which may be implemented through and applied to a biped robot impedance control apparatus shown in FIG. 4 or a biped robot shown in FIG. 5, or implemented through a computer readable storage medium. It should be noted that, the steps illustrated in the flow charts of the drawings can be performed in a computer system including a set of computer executable instructions, and although a logical order has shown in the flow charts, in some cases, the shown or described steps can be performed in a different order than the ones described herein. As shown in FIG. 1, the method includes the following steps.

S101: correcting an impact force on a landing leg in the two legs of the biped robot using a natural attenuation function, and taking the corrected impact force as an input of an impedance control.

In this embodiment, the natural attenuation function is a natural attenuation function $Y=e^{-\alpha t}$ with $\alpha>0$. In which, a determines the speed of attenuation and is therefore used an attenuation coefficient. When $t=0$, the function is equal to 1; after an infinite time passed, the function decays to 0. The larger the attenuation coefficient, the larger the initial attenuation speed. However, the function returns to 0 again after the infinite time passed. In this embodiment, the impact force acting on the landing leg (i.e., the left leg or the right leg) of the biped robot is the external force to be paid attention to. By using the product of the natural attenuation function and the external force as the input of the impedance control, it can make the external force gradually decaying to zero with time passing without deformation.

S102: obtaining an impedance model of the biped robot.

In this embodiment, the impedance model includes:

$$M\ddot{X}+B\dot{X}+KX=F;$$

where, M is a virtual mass matrix of the biped robot, B is a damping coefficient matrix, K is a stiffness matrix, F is the impact force on the landing leg in the two legs of the biped robot, and X is a pose column vector of a leg coordinate system of the biped robot in a waist coordinate system of the biped robot. The impedance model of internal parameters and external force relationship of the robot is established to facilitate the subsequent analysis of the input of the impedance control, thereby determining the optimization scheme for keeping the stableness of the behaviors of the robot.

S103: determining a transfer function of the impedance control based on the impedance model.

In this embodiment, step S103 includes determining the transfer function of the impedance control based on the impedance model through an equation of:

$$\frac{x}{F}=\frac{\frac{1}{m}}{s^2+\frac{b}{m}s+\frac{k}{m}};$$

where, m is the mass of the biped robot, b is a damping, k is a spring constant of a spring, F is the impact force on the landing leg in the two legs of the biped robot, and x is a pose of a leg coordinate system of the biped robot in a waist coordinate system of the biped robot, that is, the product of an external force and the natural attenuation function is used as the input of the impedance control. In which, the transfer function is only related to the impedance model. The impedance model including the natural attenuation function is taken as the expected impedance model, and the Laplace transform is performed on the model to obtain the transfer function.

S104: calculating an output of the impedance control based on the input of the impedance control and the transfer function of the impedance control.

In this embodiment, the external force acting on the legs of the biped robot during walking is the external force to be paid attention to. By using the product of the natural attenuation function and the external force as the input of the impedance control, it can make the external force gradually decaying to zero with time passing without deformation, for instance, the external force acting on the biped robot and the natural attenuation function are taken as the input of the impedance control, and then the Labres transform is performed on the impedance model including the attenuation function to obtain the transfer function of the impedance model according to the desired effect of the impedance control.

S105: determining a joint angle of each joint based on the output of the impedance control and a planned pose of the biped robot.

The pose of the biped robot includes a position and a posture of the biped robot. In this embodiment, after the deformation corresponding to the damping force for each degree of freedom (DOF) is obtained, the obtained deformations are superimposed on a planned end coordinate system. In which, the degree of freedom of a joint may include three positions and three postures that are represented as (x, y, z, roll, pith, yaw), and after obtaining the output of the impedance control that is attenuated in a natural manner, the new supporting leg-waist-landing leg pose of the biped robot at each moment is determined, and then the inverse kinematics algorithm is used to calculate the joint angle of each degree of freedom, for example, the deformations of the x, y and z directions can be directly added, where the calculation of the new end pose needs to use a chain law of rotation matrix as follows:

$R_{desired} \cdot \Delta R_{rpy} = R_{command}$;

where, $\Delta R_{rpy}$ is a rotation matrix after deforming of the roll, pitch and yaw directions, which is as follows:

$$\Delta R_{rpy} = \begin{bmatrix} \cos(p)\cos(y) & \sin(r)\sin(p)\cos(y) - \cos(r)\sin(y) & \sin(r)\sin(y) + \cos(r)\sin(p)\cos(y) \\ \cos(p)\sin(y) & \sin(r)\sin(p)\sin(y) + \cos(r)\cos(y) & -\sin(r)\cos(y) + \cos(r)\sin(p)\sin(y) \\ -\sin(p) & \cos(p)\sin(r) & \cos(p)\cos(r) \end{bmatrix},$$

Figure 2:
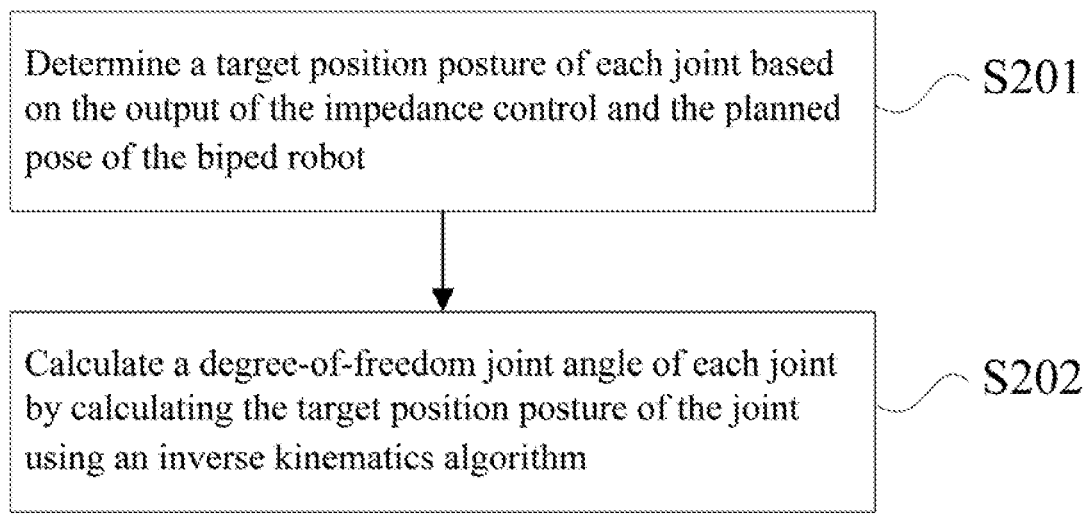
FIG. 2 is a flow chart of an example of step S105 of the biped robot impedance control method of FIG. 1.

Finally, the inverse kinematics algorithm can be used to obtain the joint angle of each joint to transmit to the motor, thereby realizing the control of the joint and maintaining the balance of the robot. FIG. 2 is a flow chart of an example of step S105 of the biped robot impedance control method of FIG. 1. In this embodiment, a method for determining the joint angle of each joint based on the output of the impedance control and the planned pose of the biped robot which is based on step S105 is provided. As shown in FIG. 2, the method includes the following steps.

S201: determining a target position posture of each joint based on the output of the impedance control and the planned pose of the biped robot.

S202: calculating a degree-of-freedom joint angle of each joint by calculating the target position posture of the joint using an inverse kinematics algorithm.

In this embodiment, the expected physical effect of the impedance control is that the landing leg of the biped robot will have the deformation in the length after being impacted in the ankle-hip direction, and the "pitch" rotational direction of the ankle will have the deformation (for assisting the landing) after a torque of the external force acts thereon. Therefore, the stiffness of the impedance control is relatively small in the two directions while the stiffness in the other four degrees of freedoms is relatively large. Therefore, in order to make a mass inertia matrix, a friction matrix, and a stiffness matrix to be diagonal so as to facilitate decoupling by the whole algorithm into six one-dimensional impedance relations, the forces measured by a six-dimensional force sensor need a rotation transformation and then multiplied by the attenuation function, and then being taken as the input of the impedance control. For example, in the formula of $M\ddot{X}+B\dot{X}+KX=F \cdot e^{-\alpha t}$, X is a 6*1 column vector, which contains six elements of x, y, z, roll, pitch and paw of the landing leg of the biped robot in the waist coordinate system. M is virtual 6-dimensional quantity of a 6*6 system, B is a virtual damping matrix of the 6*6 system of the, and K is a virtual stiffness matrix of the 6*6 system. For a six-dimensional full rank matrix K, there is always an orientation can be found to make the matrix K to be diagonal (by using the tools such as the eigenvalues in linear algebra and diagonalization), so as to decompose a six-degree-of-freedom impedance equation into six one-degree-of-freedom impedance equations, which will greatly simplify the calculation amount and obtain the desired effect of the impedance control quickly and easily. In which, the impedance equation after decoupling is as follows:

$$\begin{bmatrix} m_1 & & & & & \\ & m_2 & & & & \\ & & m_3 & & & \\ & & & m_4 & & \\ & & & & m_5 & \\ & & & & & m_6 \end{bmatrix} \cdot \ddot{X} + \begin{bmatrix} b_1 & & & & & \\ & b_2 & & & & \\ & & b_3 & & & \\ & & & b_4 & & \\ & & & & b_5 & \\ & & & & & b_6 \end{bmatrix} \cdot$$

-continued $$\dot{X} + \begin{bmatrix} k_1 & & & & & \\ & k_2 & & & & \\ & & k_3 & & & \\ & & & k_4 & & \\ & & & & k_5 & \\ & & & & & k_6 \end{bmatrix} \cdot X = F \cdot e^{-\omega}$$

After decoupling, at each degree of freedom, there can be the following attenuation impedance equation of scalar form:

$$m\ddot{x}+b\dot{x}+kx=F_i \cdot e^{-\alpha t};  \quad (5)$$

where, m is the virtual mass of the degree of freedom, k is the desired stiffness of the degree of freedom, x is the deformation (x, y, z, roll, pith, yaw) of three shifting or three rotational degree of freedom of the coordinate system of the ankle-hip direction, F is an physical quantity of the measured external force (torque) after rotation. The friction coefficient b can be adjusted according to the tracking ability of the system hardware of the biped robot. Under ideal conditions, the system has a high bandwidth and a good tracking ability, and the friction coefficient at which the damping ratio equal to 1 (i.e., the critical damping) can be selected. However, in practice, the system response speed is limited, and the damping ratio can be appropriately increased in the impedance so as to stabilize the system. For example, taking the Z-direction impedance as an example, it is related to the deformation of the leg length after the force acts on the biped robot. If the virtual mass in the Z direction is m=1 kg, a 1 cm deformation will generate per 500N of the stiffness, where k=500/0.01=50000N/m, and the damping coefficient b=1 (i.e., the critical damping). At t=0, the Laplace transform is as follows:

$$\frac{x}{F_z} = \frac{\frac{1}{m}}{s^2 + \frac{b}{m}s + \frac{k}{m}};$$

where, in the right part of the equation is the transfer function of the impedance of this degree of freedom, and numerical values are substituted into the transfer function to obtain a transfer function of continuous system as follows:

$$\frac{1}{s^2 + 447.2s + 50000};$$

in a real robot systems, the real-time control period is 1 millisecond, and the transfer function of discrete system is obtained through a bilinear transformation as follows:

$$\frac{2.022 \cdot 10^{-7} z^2 + 4.045 \cdot 10^{-7} z + 2.022 \cdot 10^{-7}}{z^2 - 1.598z + 0.6382}.$$

After the deformation corresponding to the damping force is obtained at each degree of freedom, the obtained deformations are superimposed on the planned end coordinate system pose, and finally the inverse kinematics algorithm is used to obtain a new joint angle. Based on this, this embodiment further provides an example of the inverse kinematics algorithm using a geometric method, which has a key step that calculates a vector from the ankle to the hip joint to represent in the ankle coordinate system. Taking the right leg is suspended and the pose of the right leg with respect to the waist is provided as an example, six joint angles of the right leg is calculated, where w is the waist coordinate system, f is the leg coordinate system, 0 is the hip rotational coordinate system, and 6 is an ankle outward swing coordinate system. It is known that the pose of the right leg in the waist coordinate system is $^wT_f$, which can obtain by using the chain rule of homogeneous transformation matrix that:

$$^wT_f = {^wT_0} \cdot {^0T_6} \cdot {^6T_f} = \begin{bmatrix} ^wR_f & ^wd_f \\ 0 & 1 \end{bmatrix};$$

$$^wT_0 = \begin{bmatrix} 1 & 0 & 0 & 0 \\ 0 & 1 & 0 & -L_1 \\ 0 & 0 & 1 & -L_2 \\ 0 & 0 & 0 & 1 \end{bmatrix}; \text{ and}$$

$$^6T_f = \begin{bmatrix} 1 & 0 & 0 & 0 \\ 0 & 1 & 0 & 0 \\ 0 & 0 & 1 & -L_5 \\ 0 & 0 & 0 & 1 \end{bmatrix};$$

where, the vector from the ankle to the hip joint in the ankle coordinate system is represented as:

$$^6d_{6,0} = -{^wd_f} + {^wR_f^r}\begin{bmatrix} 0 \\ -L_1 \\ -L_2 \end{bmatrix} + \begin{bmatrix} 0 \\ 0 \\ -L_5 \end{bmatrix} = \begin{bmatrix} r_x \\ r_y \\ r_z \end{bmatrix};$$

Figure 3:
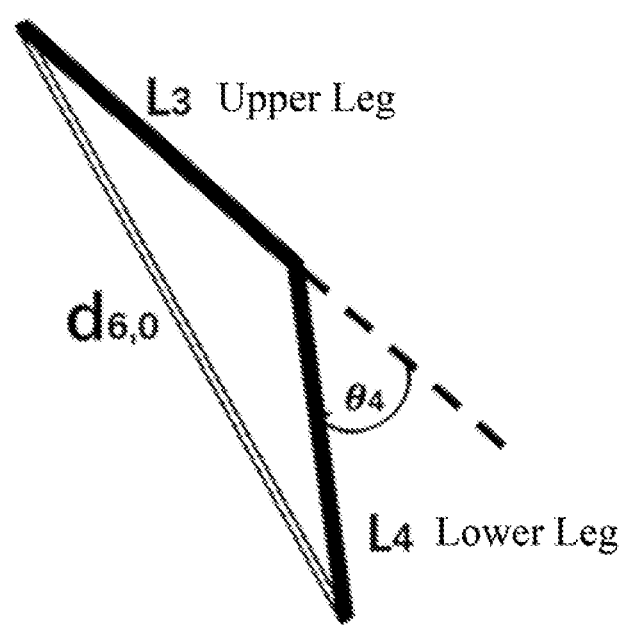
FIG. 3 is a schematic diagram of a coordinate system established in the biped robot impedance control method of FIG. 1.

FIG. 3 is a schematic diagram of a coordinate system established in the biped robot impedance control method of FIG. 1. As shown in FIG. 3, a bending angle $\theta_4$ of the knee is then calculated using the cosine theorem. Since the knee can only bend backwards, its range is $[-\pi, 0]$:

$$r = norm(d_{6,0}); \text{ and}$$

$$\theta_4 = \operatorname{acos}\frac{L_3^2 + L_4^2 + r^2}{2L_3L_4} - \pi;$$

by projecting the hip joint onto the y-z plane of the ankle coordinate system, a side swing angle $\theta_6$ of the ankle can be calculated as follows:

$$\theta_6 = \operatorname{atan}2(-r_y, r_x);$$

by using the information of the angles $\theta_4$ and $\theta_6$, the hip joint can be projected onto a x-z plane of the ankle coordinate system, and forward swing angle $\theta_5$ of the ankle can be calculated as follows:

$$\beta = \operatorname{asin}\left[\frac{L_3 - \sin(\pi - \theta_4)}{r}\right];$$

$$\gamma = -\operatorname{atan}2(r_x, \operatorname{sign}(r_z) \cdot \sqrt{r_y^2 + r_z^2}); \text{ and}$$

$$\theta_5 = -\gamma - \beta;$$

three rotational axes at the hip joint are orthogonal to each other and correspond to $\theta_1$, $\theta_2$, and $\theta_3$, respectively, and three resulting poses of them can be obtained by reverse derivation as follows:

$$^0R_3 \cdot {^3R_4} \cdot {^4R_5} \cdot {^5R_6} = {^wR_f};$$

$$^0R_3 = {^wR_f} \cdot ({^3R_4} \cdot {^4R_5} \cdot {^5R_6})^T;$$

$$\theta_1 = \operatorname{atan}2({^0R_3}(2,1), {^0R_3}(2,2));$$

$\theta_2 = \text{atan } 2(-^0R_3(2,3),^0R_3(2,1)\cdot\sin\theta_1+^9R_3(2,2)\cdot\cos\theta_1);$ and $\theta_3 = \text{atan } 2(^0R_3(1,3),^0R_3(3,3));$ where, in the inverse kinematics calculation of the left leg, the sign of L, can be changed. For the specific implementation process, the content of the above-mentioned embodiment can be referred to.

S106: transmitting joint angle information of each joint to motor(s) of the joint so that the motor(s) perform the impedance control on the corresponding leg of the robot.

In this embodiment, it corrects an impact force on a landing leg in the two legs of the biped robot using a natural attenuation function, and taking the corrected impact force as an input of an impedance control; obtains an impedance model of the biped robot; determines a transfer function of the impedance control based on the impedance model; calculates an output of the impedance control based on the input of the impedance control and the transfer function of the impedance control; determines a joint angle of each joint based on the output of the impedance control and a planned pose of the biped robot; and transmits joint angle information of each joint to motor(s) of the joint so that the motor(s) perform the impedance control on the corresponding leg of the robot. Which realizes the adjustment of the impedance control of the legs of the biped robot by modifying the external force input in the impedance control using the natural attenuation function, thereby avoiding the deformation of the robot caused by the impedance control that affects the balance of the robot when walking, so that the robot can walk in a more stable and natural manner.

Figure 4:
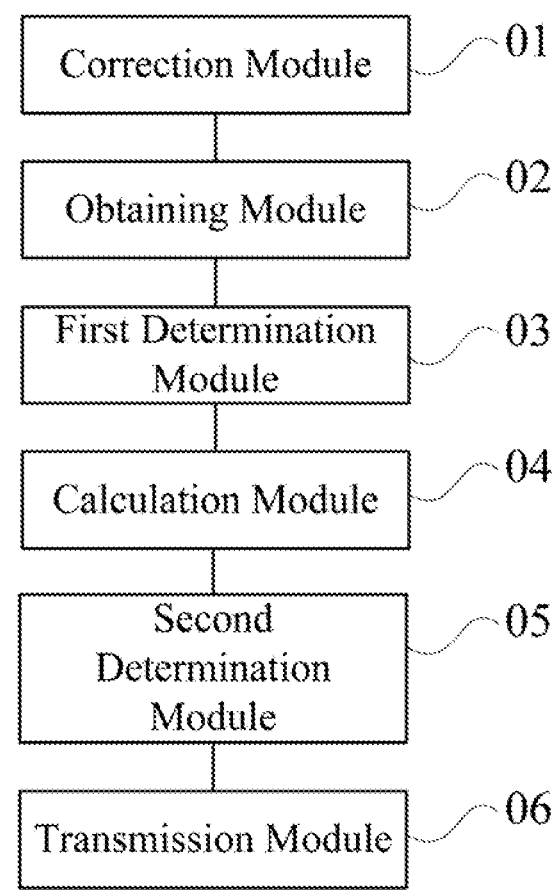
FIG. 4 is a schematic block diagram of an embodiment of a biped robot impedance control apparatus according to the present disclosure.

FIG. 4 is a schematic block diagram of an embodiment of a biped robot impedance control apparatus according to the present disclosure. In this embodiment, an impedance control apparatus for a biped robot having two legs (e.g., a left leg and a right leg) is provided. In which, each leg includes one or more joints, where each joint includes a motor. The impedance control apparatus corresponds to the above-mentioned joint control method of FIG. 1. As shown in FIG. 4, the impedance control apparatus includes:

a correction module 01 configured to correct an impact force on a landing leg in the two legs of the biped robot using a natural attenuation function, and taking the corrected impact force as an input of an impedance control;

an obtaining module 02 configured to obtain an impedance model of the biped robot;

a first determination module 03 configured to determine a transfer function of the impedance control based on the impedance model;

a calculation module 04 configured to calculate an output of the impedance control based on the input of the impedance control and the transfer function of the impedance control;

a second determination module 05 configured to determining a joint angle of each joint based on the output of the impedance control and a planned pose of the biped robot; and a transmission module 06 configured to transmit joint angle information of each joint to motor(s) of the joint so that the motor(s) perform the impedance control on the corresponding leg of the robot.

In this embodiment, each of the above-mentioned modules/units is implemented in the form of software, which can be computer program(s) stored in a memory of the impedance control apparatus and executable on a processor of the impedance control apparatus. In other embodiments, each of the above-mentioned modules/units may be implemented in the form of hardware (e.g., a circuit of the impedance control apparatus which is coupled to the processor of the impedance control apparatus) or a combination of hardware and software (e.g., a circuit with a single chip microcomputer).

The implementation principle and technical effects of the apparatus provided by this embodiment are the same as those of the foregoing method embodiments. In order to simplify the descriptions, those not mentioned in the apparatus embodiment, reference may be made to the corresponding content in the foregoing method embodiment. For those skilled in the art, it can be clearly understood that, for the convenience and brevity of the description, the specific working process of the apparatus described above can refer to the corresponding process in the foregoing method embodiment, and details are not described herein.

Figure 5:
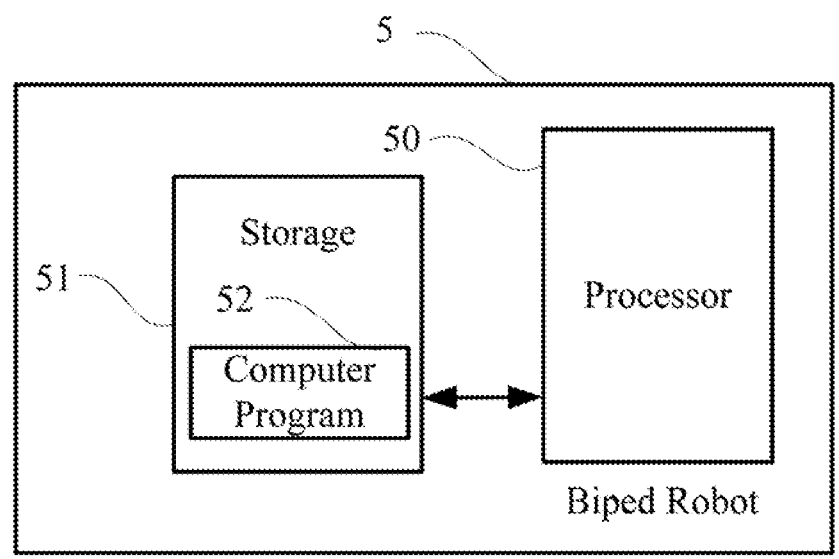
FIG. 5 is a schematic block diagram of an embodiment of a biped robot according to the present disclosure.

FIG. 5 is a schematic diagram of an embodiment of a tandem robot according to the present disclosure. In this embodiment, a biped robot 5 having two legs (e.g., a left leg and a right leg) is provided. In which, each leg includes one or more joints, where each joint includes a motor. The biped robot 5 includes a storage 5, a processor 50, and a computer program 52 stored on the storage 51 and executable on the processor 50. When executing (instructions in) the computer program, the processor implements the steps in the above-mentioned method embodiment one, for example, steps S101-S106 shown in FIG. 1. Alternatively, when the processor executes the (instructions in) computer program 52, the functions of each module/unit in the above-mentioned device embodiments, for example, the functions of the modules 01-06 shown in FIG. 4 are implemented.

The present disclosure also provides a computer readable medium having processor-executable non-volatile program codes, where the program codes causes the processor to perform the above-mentioned methods.

In addition, in the descriptions of the embodiments of the present disclosure, the terms "installed", "connected to each other", and "connected" are to be understood broadly, unless otherwise expressly stated and limited. For example, they can represent a fixed connection, a detachable connection, or integral connection; can be mechanical connection or electrical connection; can be a direct connection, a connection with each other through an intermediate medium, or an internal communication between two elements. For those skilled in the art, the specific meaning of the above-mentioned terms in the present disclosure can be understood based on specific circumstances.

In the descriptions of the present disclosure, it is to be noted that, the orientation or positional relationship indicated by the terms "center", "upper", "lower", "left", "right", "vertical", "horizontal", "inside", "outside", and the like is based on the orientation or positional relationship shown in the drawings, which is merely for the convenience of describing the present disclosure and simplifying the descriptions, rather than indicating or implying that the apparatus or component referred to has a specific orientation, or be constructed and operated in a specific orientation, and therefore cannot to be understood as limiting the present disclosure. Moreover, the terms "first," "second," and "third" are used for descriptive purposes only, and cannot to be construed as indicating or implying relative importance.

In the embodiments provided by the present disclosure, it is to be understood that the disclosed apparatus and method can be implemented in other ways. The device embodiments described above are merely illustrative. For one example, the division of the modules or units is merely a division of logical functions, and can be divided in other ways. For another example, combining or integrating multiple units or components with another system when being implemented; and some features can be ignored or not executed. In another aspect, the coupling such as direct coupling and communication connection which is shown or discussed can be implemented through some communication interfaces, and the indirect coupling and the communication connection between devices or units can be electrical, mechanical, or otherwise.

The units described as separated components can or cannot be physically separate, and the components shown as units can or cannot be physical units, that is, can be located in one place or distributed over a plurality of network elements. It is possible to select some or all of the units in accordance with the actual needs to achieve the object of the embodiments.

In addition, each of the functional units in each of the embodiments of the present disclosure can be integrated in one processing unit. Each unit can be physically exists alone, or two or more units can be integrated in one unit.

When the above-mentioned function is implemented in the form of a software functional unit and is sold or used as an independent product, which may be stored in a non-transitory computer-readable storage medium that can be executed by the processor. Based on this understanding, all or a part of the technical solution of the present disclosure which is fundamental or contributes to the prior art or a part of the technical solution may be implemented in the form of a software product stored in a storage medium, which includes instruction(s) used to make a computing device (e.g., a personal computer, a server, or a network device) to perform all or part of the steps of the method described in each embodiment. The above-mentioned storage medium may include a USB flash drive, a portable hard disk, a read-only memory (ROM), a random access memory (RAM), a magnetic disk, an optical disk, or other media capable of storing program codes.

Finally, it should be noted that, the above-mentioned embodiments are merely some embodiments of the present disclosure, which are used to explain the technical solutions of the present disclosure rather than limiting thereto, and the scope of the present disclosure is not limited thereto. Although the present disclosure has been described in detail with reference to the foregoing embodiments, those skilled in the art should understand that, the technical solutions described in the foregoing embodiments can be modified, or variations can be easily conceived, or some of the technical features can be equivalently substituted, while the modifications, variations, or substitutions of the present disclosure will not make the essence of the technical solution departing from the spirit and scope of the technical solutions of the embodiments of the present disclosure, an they should all be covered by the scope of the present disclosure. In which, the scope of the present disclosure should be determined by the scope of the claims.

What is claimed is:

1. A computer-implemented impedance control method for a biped robot having two legs each comprising one or more joints, comprising executing on a processor of the biped robot steps of:
   correcting an impact force on a landing leg in the two legs of the biped robot using a natural attenuation function, and taking the corrected impact force as an input of an impedance control;
   obtaining an impedance model of the biped robot;
   determining a transfer function of the impedance control based on the impedance model;
   calculating an output of the impedance control based on the input of the impedance control and the transfer function of the impedance control;
   determining a joint angle of each joint based on the output of the impedance control and a planned pose of the biped robot; and
   transmitting joint angle information of each joint to one or more motors of the joint so that the one or more motors perform the impedance control on the corresponding leg of the robot.

2. The method of claim 1, wherein the impedance model comprises:

$$M\ddot{X} + B\dot{X} + KX = F;$$

where, M is a virtual mass matrix of the biped robot, B is a damping coefficient matrix, K is a stiffness matrix, F is the impact force on the landing leg in the two legs of the biped robot, and X is a pose column vector of a leg coordinate system of the biped robot in a waist coordinate system of the biped robot.

3. The method of claim 1, wherein the step of determining the transfer function of the impedance control based on the impedance model comprises determining the transfer function of the impedance control based on the impedance model through an equation of:

$$\frac{x}{F} = \frac{\frac{1}{m}}{s^2 + \frac{b}{m}s + \frac{k}{m}};$$

where, m is the mass of the biped robot, b is a damping, k is a spring constant of a spring, F is the impact force on the landing leg in the two legs of the biped robot, and x is a pose of a leg coordinate system of the biped robot in a waist coordinate system of the biped robot.

4. The method of claim 1, wherein the step of determining the joint angle of each joint based on the output of the impedance control and the planned pose of the biped robot comprises:
   determining a target position posture of each joint based on the output of the impedance control and the planned pose of the biped robot; and
   calculating a degree-of-freedom joint angle of each joint by calculating the target position posture of the joint using an inverse kinematics algorithm.

5. The method of claim 1, wherein the input of the impedance control comprises the product of the natural attenuation function and the external force.

6. An impedance control apparatus for a biped robot having two legs each comprising one or more joints, comprising:
   a correction module configured to correct an impact force on a landing leg in the two legs of the biped robot using a natural attenuation function, and taking the corrected impact force as an input of an impedance control;
   an obtaining module configured to obtain an impedance model of the biped robot;
   a first determination module configured to determine a transfer function of the impedance control based on the impedance model;
   a calculation module configured to calculate an output of the impedance control based on the input of the impedance control and the transfer function of the impedance control;

a second determination module configured to determining a joint angle of each joint based on the output of the impedance control and a planned pose of the biped robot; and a transmission module configured to transmit joint angle information of each joint to one or more motors of the joint so that the one or more motors perform the impedance control on the corresponding leg of the robot.

7. The apparatus of claim 6, wherein the input of the impedance control comprises the product of the natural attenuation function and the external force.

8. A biped robot, comprising:

two legs each comprising one or more joints;

a memory;

a processor, and one or more computer programs stored in the memory and executable on the processor, wherein the one or more computer programs comprise:

instructions for correcting an impact force on a landing leg in the two legs of the biped robot using a natural attenuation function, and taking the corrected impact force as an input of an impedance control;

instructions for obtaining an impedance model of the biped robot;

instructions for determining a transfer function of the impedance control based on the impedance model;

instructions for calculating an output of the impedance control based on the input of the impedance control and the transfer function of the impedance control;

instructions for determining a joint angle of each joint based on the output of the impedance control and a planned pose of the biped robot; and instructions for transmitting joint angle information of each joint to one or more motors of the joint so that the one or more motors perform the impedance control on the corresponding leg of the robot.

9. The biped robot of claim 8, wherein the impedance model comprises:

$$M\ddot{X}+B\dot{X}+KX=F;$$

where, M is a virtual mass matrix of the biped robot, B is a damping coefficient matrix, K is a stiffness matrix, F is the impact force on the landing leg in the two legs of the biped robot, and X is a pose column vector of a leg coordinate system of the biped robot in a waist coordinate system of the biped robot.

10. The biped robot of claim 8, wherein the instructions for determining the transfer function of the impedance control based on the impedance model comprise instructions for determining the transfer function of the impedance control based on the impedance model through an equation of:

$$\frac{x}{F} = \frac{\frac{1}{m}}{s^2 + \frac{b}{m}s + \frac{k}{m}};$$

where, m is the mass of the biped robot, b is a damping, k is a spring constant of a spring, F is the impact force on the landing leg in the two legs of the biped robot, and x is a pose of a leg coordinate system of the biped robot in a waist coordinate system of the biped robot.

11. The biped robot of claim 8, wherein the instructions for determining the joint angle of each joint based on the output of the impedance control and the planned pose of the biped robot comprise:

instructions for determining a target position posture of each joint based on the output of the impedance control and the planned pose of the biped robot; and instructions for calculating a degree-of-freedom joint angle of each joint by calculating the target position posture of the joint using an inverse kinematics algorithm.

12. The biped robot of claim 8, wherein the input of the impedance control comprises the product of the natural attenuation function and the external force.

* * * * *